(12) United States Patent
Li et al.

(10) Patent No.: US 11,372,489 B2
(45) Date of Patent: Jun. 28, 2022

(54) TOUCH PANEL AND DISPLAY DEVICE THEREOF

(71) Applicant: WUHAN CHINA STAR OPTOELECTRONICS SEMICONDUCTOR DISPLAY TECHNOLOGY CO., LTD., Wuhan (CN)

(72) Inventors: Peng Li, Wuhan (CN); Shaojing Wu, Wuhan (CN)

( * ) Notice: Subject to any disclaimer, the term of this patent is extended or adjusted under 35 U.S.C. 154(b) by 283 days.

(21) Appl. No.: 16/639,761

(22) PCT Filed: Jan. 7, 2020

(86) PCT No.: PCT/CN2020/070605
§ 371 (c)(1),
(2) Date: Feb. 18, 2020

(87) PCT Pub. No.: WO2021/017414
PCT Pub. Date: Feb. 4, 2021

(65) Prior Publication Data
US 2021/0397279 A1    Dec. 23, 2021

(30) Foreign Application Priority Data

Aug. 1, 2019    (CN) .......................... 201910705053.6

(51) Int. Cl.
*G06F 3/041*    (2006.01)
*G06F 3/044*    (2006.01)

(52) U.S. Cl.
CPC .......... *G06F 3/0412* (2013.01); *G06F 3/0446* (2019.05); *G06F 2203/04112* (2013.01)

(58) Field of Classification Search
CPC combination set(s) only.
See application file for complete search history.

(56) References Cited

U.S. PATENT DOCUMENTS

| | | | |
|---|---|---|---|
| 2009/0163020 A1 | 6/2009 | Ryu | |
| 2014/0360761 A1 | 12/2014 | Seo et al. | |
| 2016/0026291 A1 | 1/2016 | Zhao et al. | |
| 2016/0274716 A1 | 9/2016 | Liu et al. | |
| 2018/0173346 A1* | 6/2018 | Du | H01L 27/1214 |
| 2019/0051707 A1 | 2/2019 | Li | |
| 2019/0377457 A1 | 12/2019 | Nakayama et al. | |
| 2020/0110490 A1 | 4/2020 | Zhang et al. | |

FOREIGN PATENT DOCUMENTS

| | | |
|---|---|---|
| CN | 101465316 A | 6/2009 |
| CN | 101561728 A | 10/2009 |
| CN | 104115570 A | 10/2014 |

(Continued)

*Primary Examiner* — Deeprose Subedi

(57) ABSTRACT

A touch panel and a display device thereof are provided, including a first metal layer, an insulating layer, and a second metal layer. The second metal layer includes a plurality of first metal lines and a plurality of second metal lines, and the first metal lines and the second metal lines are interlaced with each other to form a mesh pattern. The insulating layer is disposed with a via hole, and the first metal layer is electrically connected to the second metal layer through the via hole. A dummy pattern is disposed in a non-functional area of the first metal layer.

10 Claims, 3 Drawing Sheets

(56) References Cited

FOREIGN PATENT DOCUMENTS

| | | | |
|---|---|---|---|
| CN | 104142772 | A | 11/2014 |
| CN | 107482040 | A | 12/2017 |
| CN | 107632436 | A | 1/2018 |
| CN | 107656646 | A | 2/2018 |
| CN | 108536329 | A | 9/2018 |
| CN | 110010668 | A | 7/2019 |
| EP | 3153946 | A1 | 4/2017 |

* cited by examiner

TOUCH PANEL AND DISPLAY DEVICE THEREOF

FIELD OF INVENTION

The present invention relates to the field of touch technology, and more particularly, to a touch panel and a display device.

BACKGROUND

Active-matrix organic light-emitting diodes or active-matrix organic light-emitting diode (AMOLED) display panels have gradually become next-generation display technologies due to properties such as high contrast, wide color gamut, low power consumption, and foldability. Touch technology of AMOLED display panel has gradually developed from an external add-on touch panel (touch panel, TP) technology to a direct touch packaging film layer (direct on thin film encapsulation touch (DOT)) technology. Compared with the external TP technology, the DOT technology is directly integrated on display panels without a need for a separate flexible printed circuit board (FPC), making it lower cost and more conducive to achieving flexible bending of the display panels.

Conventional direct on thin film encapsulation touch (DOT) technology is a metal mesh structure using grid lines made of metal. That is, touch signal is captured and identified through mutual capacitance sensed by the grid lines made of metal, which were processed by photo-exposure and etching. However, due to limitations of the prior art, in the photo-exposure and etching processes, uneven etching often occurs with such a mesh-like design, which affects touch function of DOT products and also reduces a yield of the DOT products.

SUMMARY

The present invention provides a touch panel and a display device thereof. Dummy patterns are designed in a non-functional area of a first metal layer to solve technical problems such as a touch function of a touch panel being affected by a phenomenon of uneven etching resulting from a large difference in etching rates to the first metal layer and a second metal layer during an etching process of an existing touch panel after a photo-exposure process, as well as reduction of a production yield of the touch panel.

In order to solve the above technical problems, the technical solutions provided by the present invention are as follows:

The present invention provides a touch panel comprising a first metal layer, an insulating layer, and a second metal layer, wherein the second metal layer comprises a plurality of first metal lines and a plurality of second metal lines, and the first metal lines and the second metal lines are interlaced with each other to form a mesh pattern, and wherein the insulation layer is disposed with a via hole, and the first metal layer is electrically connected to the second metal layer through the via hole, and wherein a dummy pattern is disposed in a non-functional area of the first metal layer.

In some embodiments of the present invention, the dummy pattern comprises a first dummy pattern, and the first dummy pattern is disposed in a non-functional area of the second metal layer.

In some embodiments of the present invention, a shape of the first dummy pattern is the same as a shape of a pattern of a functional area of the first metal layer.

In some embodiments of the present invention, the dummy pattern comprises a second dummy pattern, and the second dummy pattern is disposed on the insulating layer.

In some embodiments of the present invention, the second dummy pattern is disposed in a non-functional area of the via hole.

In some embodiments of the present invention, a shape of the second dummy pattern is the same as a shape of the via hole.

In some embodiments of the present invention, the second dummy pattern is disposed on a first target area in the insulating layer, and the first target area is an area other than areas corresponding to the first metal line and the second metal line.

In some embodiments of the present invention, the mesh pattern comprises a plurality of grids, and the second dummy pattern is disposed on a second target area in the insulating layer, and the second target area is at an overlapping place of the plurality of grids.

In some embodiments of the present invention, the overlapping place is located outside a light-emitting opening area of a pixel.

In some embodiments of the present invention, a material of the insulating layer is a transparent material.

According to the above objects of the present invention, a display device is provided, comprising the touch panel described above, wherein the display device comprises a first metal layer, an insulating layer, and a second metal layer;

wherein the second metal layer comprises a plurality of first metal lines and a plurality of second metal lines, and the first metal lines and the second metal lines are interlaced with each other to form a mesh pattern, and wherein the insulation layer is disposed with a via hole, and the first metal layer is electrically connected to the second metal layer through the via hole, and wherein a dummy pattern is disposed in a non-functional area of the first metal layer.

In some embodiments of the present invention, the dummy pattern comprises a first dummy pattern, and the first dummy pattern is disposed in a non-functional area of the second metal layer.

In some embodiments of the present invention, a shape of the first dummy pattern is the same as a shape of a pattern of a functional area of the first metal layer.

In some embodiments of the present invention, the dummy pattern comprises a second dummy pattern, and the second dummy pattern is disposed on the insulating layer.

In some embodiments of the present invention, the second dummy pattern is disposed in a non-functional area of the via hole.

In some embodiments of the present invention, a shape of the second dummy pattern is the same as a shape of the via hole.

In some embodiments of the present invention, the second dummy pattern is disposed on a first target area in the insulating layer, and the first target area is an area other than areas corresponding to the first metal line and the second metal line.

In some embodiments of the present invention, the mesh pattern comprises a plurality of grids, and the second dummy pattern is disposed on a second target area in the insulating layer, and the second target area is at an overlapping place of the plurality of grids.

In some embodiments of the present invention, the overlapping place is located outside a light-emitting opening area of a pixel.

In some embodiments of the present invention, a material of the insulating layer is a transparent material.

Compared with an existing metal mesh and a touch panel thereof, a metal mesh and a touch panel thereof in the present invention are designed to dispose a dummy pattern in a non-functional area of a first metal layer. A line switching function of the first metal layer is not affected since the above design is performed to the non-functional area. However, due to the dummy pattern design, a density of the first metal layer is increased, and a density difference between the first metal layer and a second metal layer is decreased, such that a difference in etching rates between the first metal layer and the second metal layer is reduced, thereby greatly improving etching uniformity in an etching process after a photo-exposure process and a touch function of the touch panel, and increasing a production yield of the touch panel.

BRIEF DESCRIPTION OF DRAWINGS

To detailly explain the technical schemes of the embodiments or existing techniques, drawings that are used to illustrate the embodiments or existing techniques are provided. Apparently, the illustrated embodiments are just a part of those of the present disclosure. It is easy for any person having ordinary skill in the art to obtain other drawings without labor for inventiveness.

DETAILED DESCRIPTION

Figure 1:
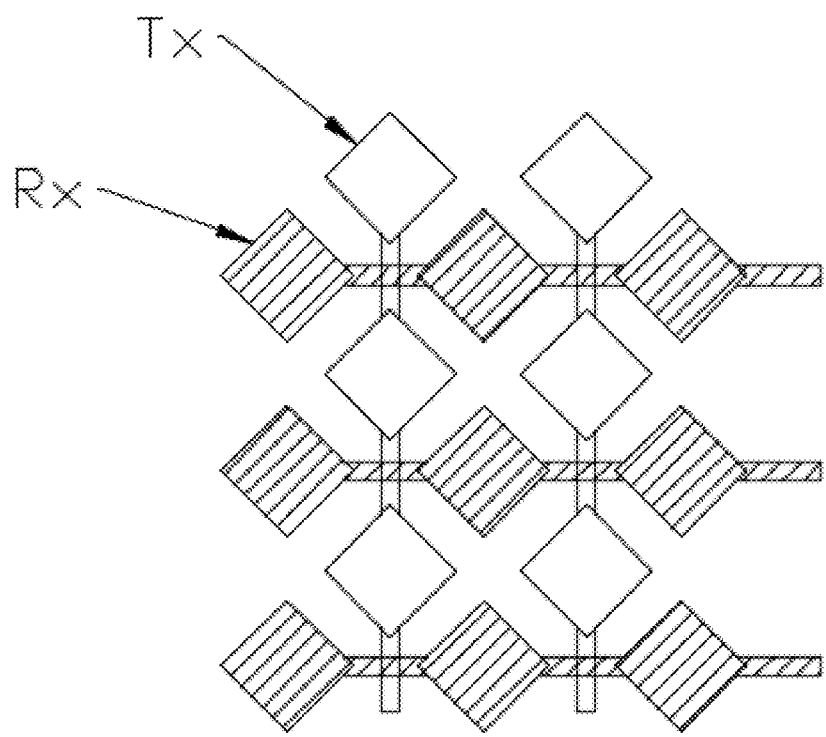
FIG. 1 is a schematic structural diagram of a touch panel in a conventional design.

In the description of the present invention, it should be understood that the terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", etc. or the positional relationship is based on the orientation or positional relationship shown in the drawings, only for the convenience of describing the present invention and simplifying the description, rather than indicating or implying that the device or element referred to must have a specific orientation, structure and operation in a specific orientation, Therefore, it cannot be understood as a limitation to the present invention. In addition, the terms "first" and "second" are used for descriptive purposes only and cannot be understood as indicating or implying relative importance or implicitly indicating the number of technical features indicated. Therefore, the features defined as "first" and "second" may explicitly or implicitly include one or more of the features. In the description of the present invention, the meaning of plurality is two or more, unless specifically defined otherwise.

The present invention provides a touch panel and a display device thereof. Dummy patterns are designed in a non-functional area of a first metal layer to solve technical problems such as a touch function of a touch panel being affected by a phenomenon of uneven etching resulting from a large difference in etching rates to the first metal layer and a second metal layer during an etching process of an existing touch panel after a photo-exposure process, as well as reduction of a production yield of the touch panel.

As shown in FIG. 1, a schematic diagram of a design principle of a conventional metal-mesh type direct on thin film encapsulation touch (DOT) design is shown. Vertical lines shown in the figure are Tx (driving electrodes) and horizontal lines are Rx (receiving electrodes). Meshes of Rx and Tx are usually designed by using a second metal layer, and a connection between adjacent meshes of left and right Rx is also designed by using the second metal layer. Bridging of adjacent meshes of upper and lower Tx is designed by using a first metal layer, and a via hole is designed between the bridged first metal layer and the second metal layer of the Tx meshes. The first metal layer is electrically connected to the second metal layer through the via hole.

Based on this, embodiments of the present invention provide a touch panel and a display device thereof, which will be described in detail below.

First, embodiments of the present invention provide a touch panel. The touch panel comprises a first metal layer, an insulating layer, and a second metal layer. The second metal layer comprises a plurality of first metal lines and a plurality of second metal lines, and the first metal lines and the second metal lines are interlaced with each other to form a mesh pattern. The insulating layer is disposed with a via hole, and the first metal layer is electrically connected to the second metal layer through the via hole. A dummy pattern is disposed in a non-functional area of the first metal layer.

Figure 2:
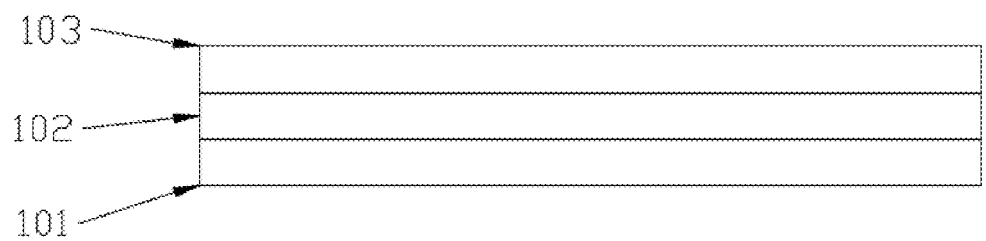
FIG. 2 is a schematic structural diagram showing a cross-section of a touch panel according to an embodiment of the present invention.

As shown in FIG. 2, a schematic structural diagram of a cross-section of a touch panel according to an embodiment of the present invention is shown. The touch panel comprises a first metal layer 101, an insulating layer 102, and a second metal layer 103. The second metal layer 103 comprises first metal lines and second metal lines. The first metal lines and the second metal lines are interlaced with each other to form a mesh pattern. The insulating layer 102 is provided with a via hole. The first metal layer 101 is electrically connected to the second metal layer 103 through the via hole. A dummy pattern is disposed in a non-functional area of the first metal layer 101.

In the embodiments of the present invention, the first metal lines comprise a plurality of Tx metal lines, and the plurality of Tx metal lines are separately arranged to form a Tx mesh pattern. The second metal lines include a plurality of Rx metal lines, and the plurality of Rx metal lines are separately arranged to form a Rx mesh pattern. The Rx metal lines and the Tx metal lines are interlaced with each other to form the mesh pattern. A connection between adjacent meshes of left and right Rx is also designed by using the second metal layer 103. Bridging of adjacent meshes of upper and lower Tx is designed by using the first metal layer 101. The first metal layer 101 comprises a functional area and a non-functional area. The functional area of the first metal layer 101 is where the bridge design is located, and this area has a function of switching lines. Outside this area is regarded as the non-functional area of the first metal layer 101, and the dummy pattern is disposed in the non-functional area of the first metal layer 101. A density of the first metal layer 101 increases, and a difference in density between the first metal layer 101 and the second metal layer 103 decreases while unaffecting the line switching function, so that a difference between etching rates of the first metal layer 101 and the second metal layer 103 is reduced, which greatly improves etching uniformity of an etching process after photo-exposure process, and improves the function of the touch panel, thereby improving the production yield of the touch panel.

On the basis of the above embodiments, in another embodiment of the present invention, the dummy pattern is further optimized. The dummy pattern comprises a first dummy pattern, and a shape of the first dummy pattern is same as that of a pattern of the functional area of the first metal layer 101. In this case, a density increasing effect of the first metal layer 101 is more significant, so that during the etching process, the etching process of the first metal layer 101 will not be slow due to excessively low density, so that a line width of the functional area of the first metal layer 101 can be guaranteed.

Figure 3:
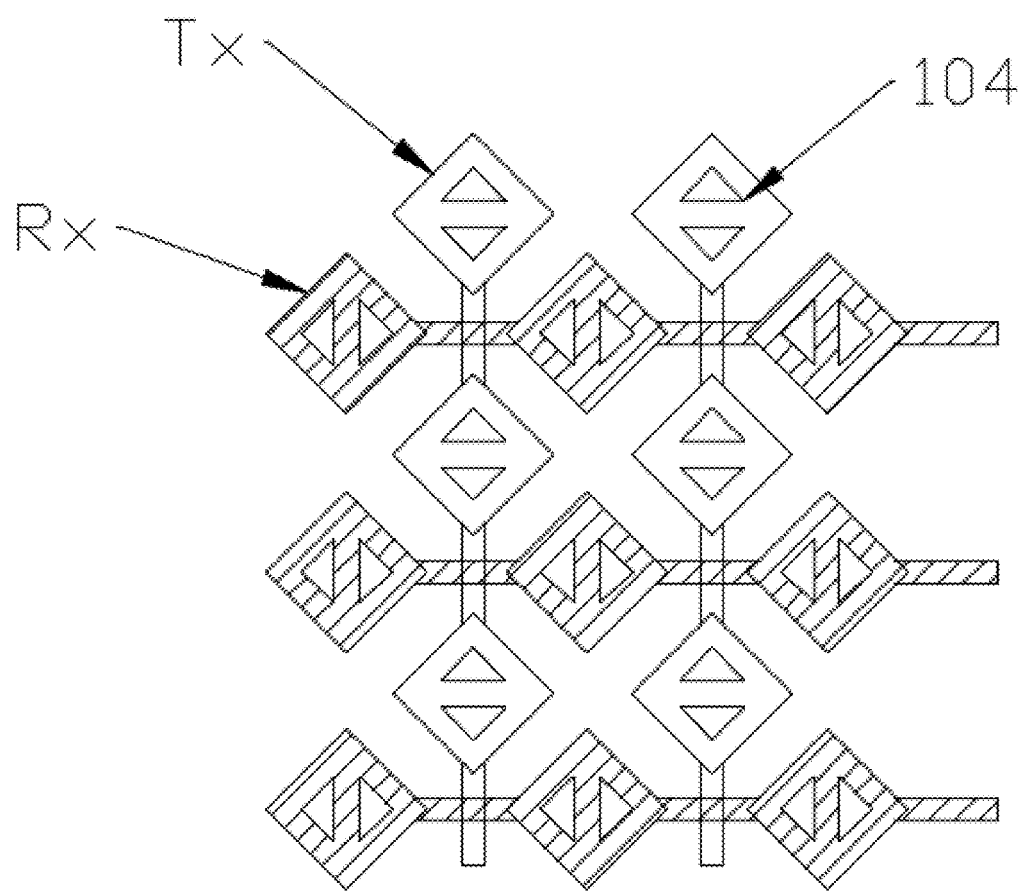
FIG. 3 is a schematic structural diagram of a touch panel according to an embodiment of the present invention.

At the same time, the first dummy pattern is further optimized. As shown in FIG. 3, a schematic structural diagram of a touch panel according to an embodiment of the present invention is shown, and the first dummy pattern 104 is disposed on a non-functional area of the second metal layer 103. It should be noted that the second metal layer 103 comprises a functional area and the non-functional area, and the functional area of the second metal layer 103 comprises a portion of a mesh area of the second metal layer 103 for touch sensing. Outside of this area is regarded as the non-functional area of the first metal layer 101. Since the DOT is very sensitive to a capacitance change between the metal layers, and parasitic capacitance brought by the first dummy pattern 104 may affect identification of the DOT, the following improvement is proposed. The first dummy pattern 104 is disposed in the non-functional area of the second metal layer 103. In this area, the design of the first dummy pattern 104 will not affect identification of the DOT. In this embodiment, the first dummy pattern 104 is designed in this area, which can prevent uneven etching and does not affect normal operation of the DOT.

Of course, in the embodiment of the present invention, the insulating layer can also be improved at the same time. Therefore, based on the above embodiment, the dummy pattern is further optimized. The dummy pattern includes a second dummy pattern. Two dummy patterns are disposed on the insulating layer 102. It should be noted that the insulating layer 102 where the via hole is located comprises a functional area and a non-functional area. The functional area of the via hole is an area where the bridge design is located. This area has the line switching function, and outside this area is the non-functional area of the via hole. Since the via hole also needs to be processed by an etching process, compared with the first metal layer, the unevenness of etching caused by an excessively low density of the via hole is even more likely to render the DOT invalid. Therefore, a dummy pattern design is also performed on the insulating layer 102. The second dummy pattern is provided in the non-functional area of the via hole. Since the via hole in the insulating layer 102 will not affect an electrical performance of the second metal layer 103, patterning can be performed in the non-functional area of the via hole in the insulating layer 102 without having to avoid the functional area of the second metal layer 103, thereby not only preventing uneven etching, but also unaffecting the normal operation of the DOT.

Similarly, the second dummy pattern is further optimized, and a shape of the second dummy pattern is same as the shape of the functional area pattern of the via hole. In this case, the density increasing effect of the via hole is more significant, so that during the etching process, the density of the via hole will not be excessively low and result in a slow etching process, which further affects the etching uniformity of the via holes.

Figure 4:
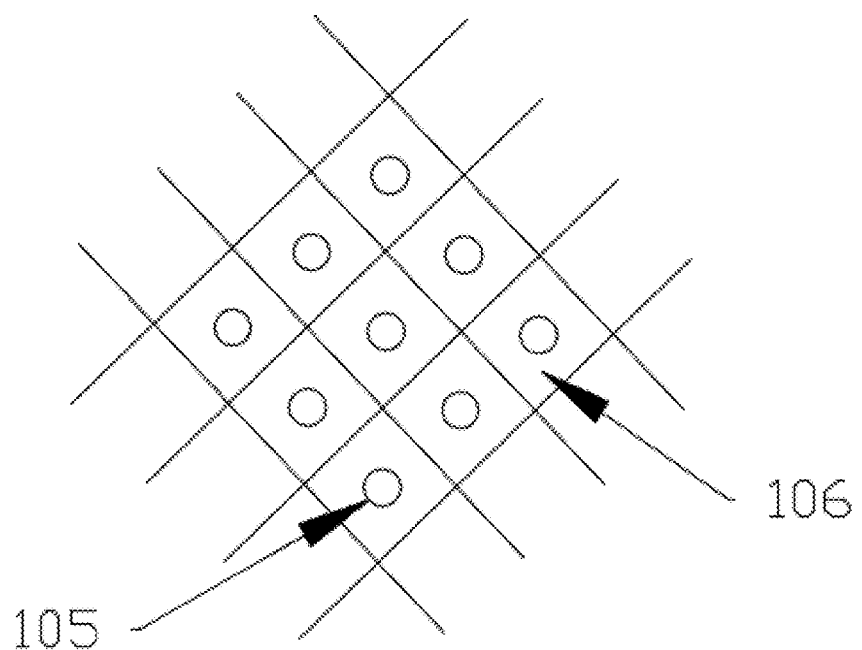
FIG. 4 is a schematic structural diagram of a touch panel according to another embodiment of the present invention.

In some embodiments of the present invention, as shown in FIG. 4, a schematic structural diagram of a touch panel according to another embodiment of the present invention is shown. The second dummy pattern 105 is disposed on a first target region 106, wherein the first target region 106 is a region other than a corresponding region of the first metal line and the second metal line in the insulating layer 102. It can be understood that the design of the second dummy pattern 105 in the insulating layer 102 does not affect the electrical performance of the functional area of the second metal layer 103. The second dummy pattern 105 does not need to avoid the functional area of the second metal layer, and the second dummy pattern 105 may be disposed in an area other than a corresponding region of the first metal line and the second metal line in the insulating layer 102.

Figure 5:
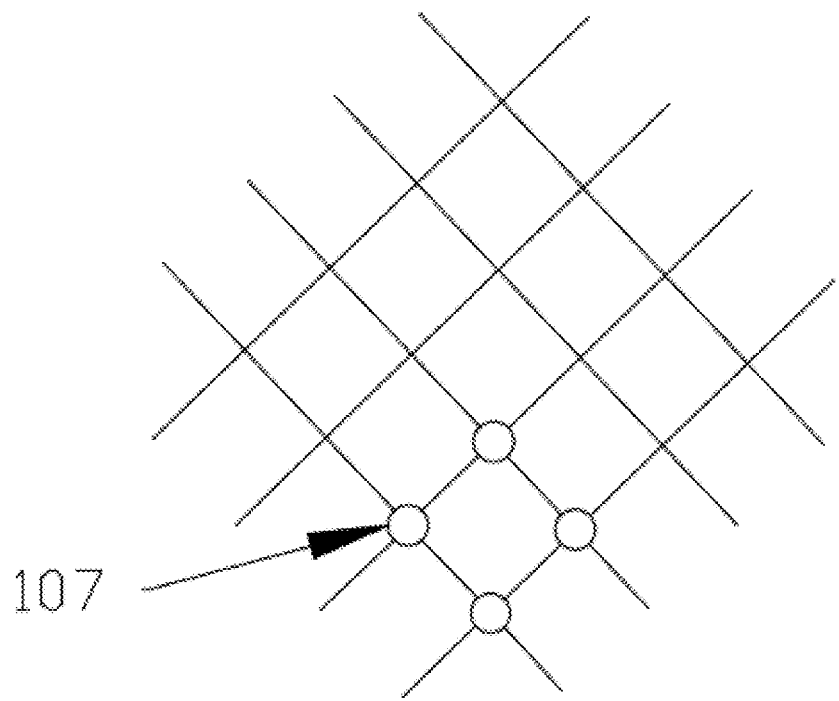
FIG. 5 is a schematic structural diagram of a touch panel according to another embodiment of the present invention.

In some other embodiments of the present invention, as shown in FIG. 5, another embodiment of the present invention of a schematic structural diagram of a touch panel is shown. This embodiment completely simulates the via hole of the insulating layer in the conventional design of the functional area of the via hole. The mesh pattern comprises a plurality of grids. The second dummy pattern 105 is disposed in a second target region 107 in the insulating layer 102. The second target region 107 is an overlapping place of the plurality of grids located outside a light-emitting opening area of a pixel in order to prevent light output from being affected. Obviously, by optimizing the second dummy pattern 105, the density of the via hole is further increased without affecting the function of the second metal layer. The problem of uneven etching of the via holes is effectively improved, and the etching uniformity of the touch panel is improved.

In addition, in order not to block light emitted from a pixel region from passing through the insulating layer 102, the insulating layer is a transparent material, including but not limited to an inorganic material, such as an optically clear (OC) adhesive layer or an inorganic non-metal oxide layer.

A material of the first metal layer 101 and the second metal layer 103 is at least one of copper, aluminum, silver, molybdenum, or titanium, or at least one of copper, aluminum, silver, molybdenum, or titanium alloys. For example, such metals and metal alloys not only have good ductility and are easy to process, but also have low resistivity, which is convenient for reducing a resistance of the first metal layer 101 and the second metal layer 103 and obtaining better touch effects.

In order to better implement the touch panel in the embodiment of the present invention, in addition to the touch panel, a display device is further provided in the embodiment of the present invention. The display device comprises the display panel as described in any one of the above embodiments of the display panel. By using the display panel described in the above embodiments, the display performance of the display device is further improved.

In the above embodiments, the description of each embodiment has its own emphasis. For the parts that are not described in detail in an embodiment, refer to the detailed descriptions of other embodiments above, which will not be repeated here. In specific implementation, each of the above units or structures may be implemented as independent entities, or any combination may be implemented as the same or several entities. For the specific implementation of the above units or structures, refer to the foregoing method embodiments. For specific implementation of the foregoing operations, refer to the foregoing embodiments, and details are not described herein again.

While the present disclosure has been described with the aforementioned preferred embodiments, it is preferable that the above embodiments should not be construed as limiting of the present disclosure. Anyone having ordinary skill in the art can make a variety of modifications and variations without departing from the spirit and scope of the present disclosure as defined by the following claims.

What is claimed is:

1. A touch panel, comprising a first metal layer, an insulating layer, a second metal layer, and a dummy pattern, wherein the second metal layer comprises a plurality of first metal lines and a plurality of second metal lines, and the first metal lines and the second metal lines are interlaced with each other to form a mesh pattern, and wherein the insulating layer is disposed with a via hole, the first metal layer is electrically connected to the second metal layer through the via hole, and the mesh pattern comprises a plurality of grids, wherein:

the dummy pattern comprises a first dummy pattern and a second dummy pattern, the first dummy pattern is disposed in a non-functional area of the second metal layer, and the second dummy pattern is disposed in a non-functional area of the via hole or the second dummy pattern is disposed in the insulating layer at an overlapping place of the plurality of grids.

2. The touch panel according to claim 1, wherein a shape of the first dummy pattern is same as a shape of a pattern of a functional area of the first metal layer.

3. The touch panel according to claim 1, wherein a shape of the second dummy pattern is same as a shape of the via hole.

4. The touch panel according to claim 1, wherein the overlapping place is located outside a light-emitting opening area of a pixel.

5. The touch panel according to claim 1, wherein a material of the insulating layer is a transparent material.

6. A display device, comprising a touch panel, wherein the touch panel comprises a first metal layer, an insulating layer, a second metal layer and a dummy pattern;

wherein the second metal layer comprises a plurality of first metal lines and a plurality of second metal lines, and the first metal lines and the second metal lines are interlaced with each other to form a mesh pattern, and wherein the insulating layer is disposed with a via hole, the first metal layer is electrically connected to the second metal layer through the via hole, and the mesh pattern comprises a plurality of grids, wherein:

the dummy pattern comprises a first dummy pattern and a second dummy pattern, the first dummy pattern is disposed in a non-functional area of the second metal layer, and the second dummy pattern is disposed in a non-functional area of the via hole or the second dummy pattern is disposed in the insulating layer at an overlapping place of the plurality of grids.

7. The display device according to claim 6, wherein a shape of the first dummy pattern is same as a shape of a pattern of a functional area of the first metal layer.

8. The display device according to claim 6, wherein a shape of the second dummy pattern is same as a shape of the via hole.

9. The display device according to claim 6, wherein the overlapping place is located outside a light-emitting opening area of a pixel.

10. The display device according to claim 6, wherein a material of the insulating layer is a transparent material.

* * * * *